United States Patent [19]

Massé

[11] Patent Number: 4,938,111
[45] Date of Patent: Jul. 3, 1990

[54] ANTI-KICKBACK DEVICE FOR A WOOD PROCESSING MACHINE

[75] Inventor: Serge Massé, Lachine, Canada

[73] Assignee: Institut de Recherche en Sante et en Securite du Travail du Quebec, West Montreal, Canada

[21] Appl. No.: 292,003

[22] Filed: Dec. 30, 1988

[30] Foreign Application Priority Data

Nov. 4, 1988 [CA] Canada .................................. 582311

[51] Int. Cl.⁵ ........................... B26D 7/06; B26D 7/22
[52] U.S. Cl. .................................... 83/425.3; 83/435; 83/436; 83/440.2; 83/444; 83/446; 83/448; 83/860; 83/DIG. 1
[58] Field of Search ...................... 83/102.1, 440.2, 444, 83/446, 448, 425.1, 425.2, 425.3, 544, 860, DIG. 1, 435, 436

[56] References Cited
U.S. PATENT DOCUMENTS

| 2,372,687 | 4/1945 | Smith | 83/440.2 |
| 2,676,625 | 4/1954 | Gustin | 83/440.2 |
| 2,731,049 | 1/1956 | Akin | 83/440.2 |
| 2,786,496 | 3/1957 | Eschenburg | 83/440.2 |
| 2,880,769 | 4/1959 | Platakis | 83/520 |
| 3,866,502 | 2/1975 | Brewer, Sr. | 83/DIG. 1 |
| 4,625,604 | 12/1986 | Handler et al. | 83/102.1 |

Primary Examiner—Douglas D. Watts
Assistant Examiner—Scott A. Smith
Attorney, Agent, or Firm—Cushman, Darby & Cushman

[57] ABSTRACT

The disclosure herein describes an anti-kickback device for use in a wood processing machine. The invention is concerned with mounting, upstream of an arrangement of circular saws, a series of fingers pivotably mounted on a shaft mounted transversely of the frame. Each finger is characterized by a curved edge, facing the lumber passing by, on which is mounted a series of peripherally spaced lumber-engaging pointed elements, each element defining a different angle with respect to the pivot axis of its shaft. Each lumber-engaging element consists of a support which is removably mounted to the curved edge and a blade, preferably made of carbide material, fixed to this support.

9 Claims, 2 Drawing Sheets

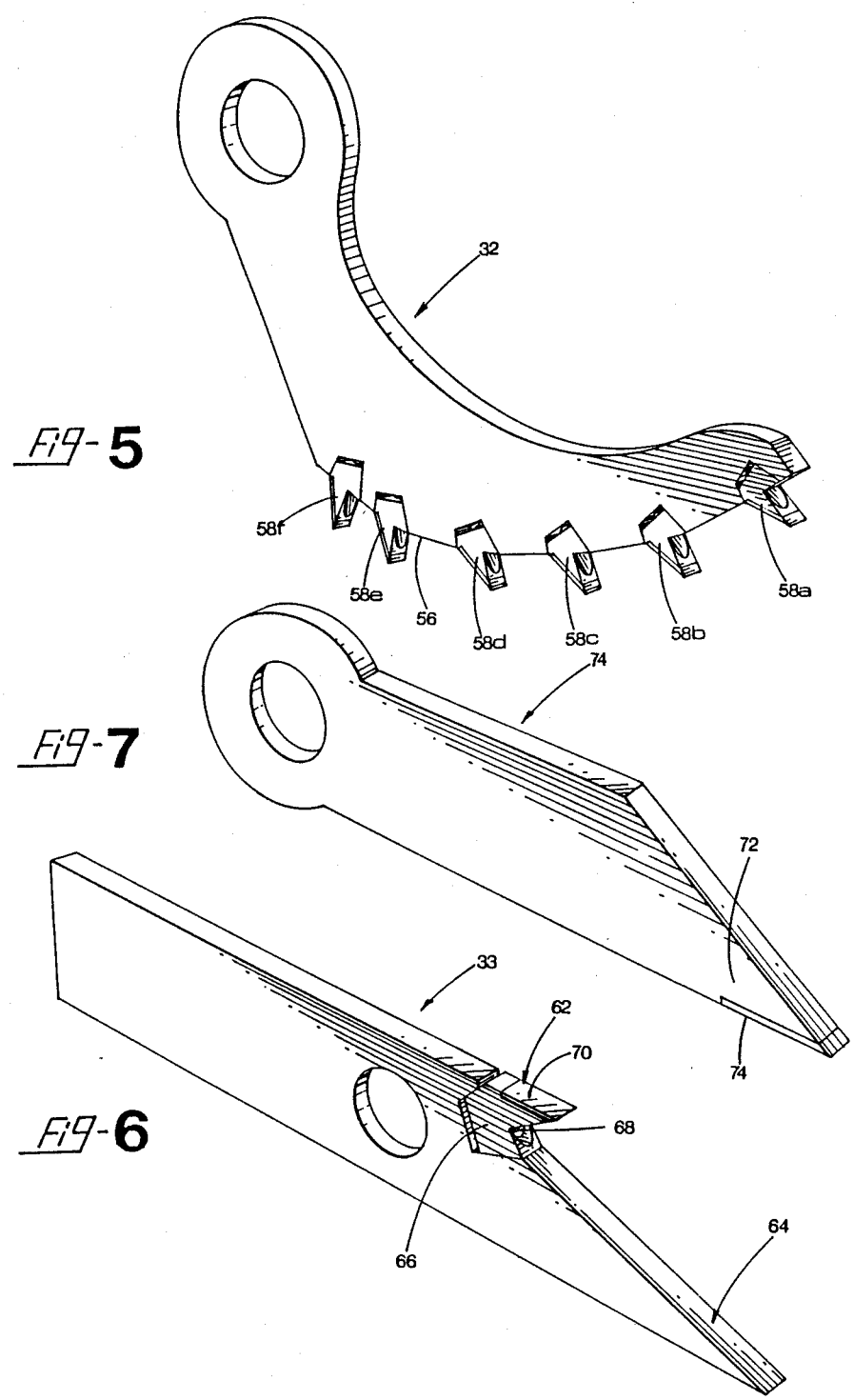

ANTI-KICKBACK DEVICE FOR A WOOD PROCESSING MACHINE

FIELD OF THE INVENTION

The present invention is directed to an anti-kickback device for use in a machine of the type used for ripsawing and square edging lumber in sawmills or woodmaking industries.

BACKGROUND OF THE INVENTION

Anti-kickback devices are installed on two types of machines: square edging machines which are provided with two or more circular saws rotating against the advance of lumber and having a variable spacing therebetween, and ripsawing machines which are provided with multiple circular saws spaced from one another at fixed intervals. Most of the latter machines have two saw-carrying shafts, one extending above the lumber, the other below. Each saw on the shaft extending below the lumber extends in a vertical plane that includes a corresponding saw on the shaft extending above the lumber. The saws disposed beneath the lumber rotate against the advance of lumber while those above rotate with the advance of lumber.

Square edging machines must be equipped with anti-kickback devices since the saw-carrying shaft rotates against the advance of the lumber which can be projected outwardly towards the operator at the feeding end of the machine.

The ripsawing machines can also project lumber towards the operator at the feeding end due to the rotational direction of the shaft located beneath the lumber as well as towards the exit end of the machine due to the rotation of the upper saws. This latter type of machine, therefore, requires anti-kickback devices at its entrance.

However, because anti-kickback devices are designed to protect against the projection of particles or full lumber pieces towards the operator, they have no use in protecting against projections from the outlet of the machine and caused by the saws located in the upper part of the machine.

Anti-kickback devices have two functions: first, they provide a curtain wall that surrounds the lumber piece that enters the machine thereby performing a blocking or sealing function to confine, inside the machine, all the lumber fragments as well as saw teeth which may break and be projected exteriorly towards the operator. To achieve this sealing function, it is required that fingers that form part of anti-kickback devices are arranged to have their contour follow as closely as possible the contour of the passing lumber to thereby minimize openings to the outside. These anti-kickback fingers must be narrow and return easily on the lumber to their closed position; they must have very little spacing between them.

This sealing function cannot be adequately obtained with a single series of anti-kickback fingers due to the various configurations of lumber pieces passing through the machine, especially those thick lumber pieces having irregular shapes.

Hence, a second series of anti-kickback fingers situated under the lumber is installed on machines, especially used for ripsawing thick lumber.

Still, two series of anti-kickback fingers are often still not sufficient to provide an adequate sealing action on ripsawing machines due to the power of these machines, to the various configurations of lumber pieces and to operating and feeding conditions.

Most machines are therefore equipped with a third series of anti-kickback fingers which are situated at the feeding end of the machine, over the lumber. A lumber piece that will kickback from the rotating saws to the entrance of the machine, with contact and pass below the first series of fingers, raise and pass above the second series of fingers and then contact and pass below the third series of fingers.

The vertical distance that extends from the tip of one series of fingers to the tip of the successive series of fingers is called the "overlap". Sealing is better obtained if the overlap is substantial. This overlap is usually expressed in percentage of the maximum thickness of the lumber which passes through the machine (ex. 75% of 8 inches).

In addition to sealing, another feature required on an antikickback finger is its ability to bite into and retain the lumber pieces, which would otherwise kickback. In order to adequately achieve this function, the fingers must contact the lumber with an angle which varies relative to the shape and the wear of the tip as well as to the physical and mechanical properties of the lumber. Beyond a predetermined tip wear, the action of a finger depends solely on the coefficient of friction between the finger extremity and the lumber. The coefficient of friction therefore determines the minimum contact angle required. In order to accomplish this second function, the fingers must be strongly built in order to oppose the kickback forces. They must have a sharp extremity as well as maintain, for various thicknesses of lumber passing by, an angle which is equal or less than the angle corresponding to the coefficient of friction between the tip and the lumber.

It is recognized that presently used fingers provide inadequate sealing due to various reasons, such as a low tip overlap, a large spacing between the fingers at the level of the tips and the general configuration of the fingers.

Various unsuccessful attempts have been made to increase the reliability of fingers with respect to their function of "biting and retaining". Principal causes are the wrong angles of lumber attack with which they must work and the rapid wear of the tips. Exception being made with lumber pieces of small thicknesses (approximately 3 and 4 inches) for finger tips located above the lumber, none of the fingers operate with angles which are less than the corresponding angle of coefficient of friction between a worn tip and lumber. The second series of fingers located underneath the lumber operate with an angle of attack which is largely greater than the angle corresponding to the coefficient of friction between the lumber and the tip. Therefore, it is rare that these fingers effectively operate in conditions to "bite and retain" the lumber (which is then kicked back).

Conclusively single tip fingers cannot perform adequately both functions, sealing and "biting and retaining" simply because both functions are incompatible with each other; if a finger adequately performs the sealing function, it is then too long to perform the "biting and retaining" function and vice versa, if a finger performs adequately the "biting and retaining" function, it is too short to perform adequately the sealing function.

The extremities of the fingers presently used wear out rapidly. It s extremely difficult to sharpen them on location or to replace them since the entire finger assembly must be dismounted. With the exception of the extremities of the second series of fingers, all others wear according to various angles depending on the thickness of the lumber which passes in the machine; this thickness varies from one lumber to another.

The extremities of the second series of fingers wear out to a shape which is somewhat more rounded than those of the other two series as they operate constantly under the same angle of attack.

OBJECTS AND STATEMENT OF THE INVENTION

It is an object of the present invention to provide fingers in which one or both functions, sealing and "biting and retaining", are adequately incorporated in the design of each finger.

It is also an object of this invention to provide on the type of machines described above three series of anti-kickback fingers which are of varying configuration from one series to another.

One function of the first series of fingers is to retain the lumber which could kickback. This is achieved by giving a curved shape to the finger that carries the tips. Since the wear of a single tip for various lumber thicknesses is considerable, the present invention is concerned with providing a different tip for each of the various thicknesses of lumber (i.e. from 1 to 8 inches). Wear will occur principally with the selected angle of attack, thereby improving the performance of the tip. Furthermore, the tips are removably installed along the curved edge of the finger, thereby increasing their reliability.

As the tips made in accordance with the present invention now work with a safety angle of contact which is based on friction only, the wear of the tip only causes a reduction in the angle of contact thereby increasing the capability of the tip to retain the lumber in case of kickback.

The above described functions of sealing and biting and retaining must also be present in the second series of fingers. Each finger includes two tips, one small, one long. The small tip performs the function of biting and retaining. Its angle of attack with the lumber remains constant because the tip lies on the underside of the lumber.

The long tip provides the sealing action while improving the overlap. This second tip is maintained sharpened but without being overly so in order to prevent the fingers from being suddenly forced to open as a result of the presence of a pointed lumber piece that would be squeezed between the tip and the upstream portion of the lumber, especially at the end of the sawing operation.

The main function of the third series of fingers is to provide sealing. These fingers must have all of the features associated with this function, which is described above with respect to the second series of fingers.

The present invention therefore relates to anti-kickback device for preventing lumber from being thrown in a direction opposite to the feeding direction of the lumber in the machine; it comprises two or more shafts mounted transversely of the frame upstream of the saws; a series of adjacently disposed fingers defining a protective curtain mounted on the shafts; the fingers being pivotably mounted on the shafts and adapted to be moved as lumber is processed to the circular saws; each finger of a series mounted on one of the shafts having a curved edge including a plurality of pointed lumber-engaging elements peripherally spaced along this curved edge to engage lumber at various optimum angles depending on the size of lumber.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention w 11 become apparent to those skilled in the art.

BRIEF DESCRIPTION OF THE DRAWINGS

FIG. 5 is a perspective view of a finger of the first series;

FIG. 6 is a perspective view of a finger of the second series; and

FIG. 7 is a perspective view of a finger of the third series.

DESCRIPTION OF PREFERRED EMBODIMENTS

Figure 1:
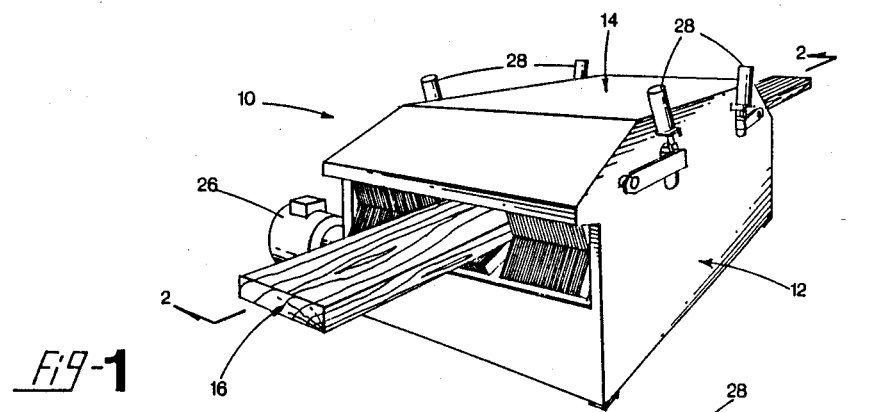
FIG. 1 is a perspective view of a sawmill machine incorporating an anti-kickback device made in accordance with the present invention.

Referring to FIG. 1, there is shown a sawmill machine 10 displaying a frame 12 and a cover assembly 14; a lumber piece 16 is shown being processed through the machine. This machine may be used for ripsawing or square edging lumber.

Figure 2:
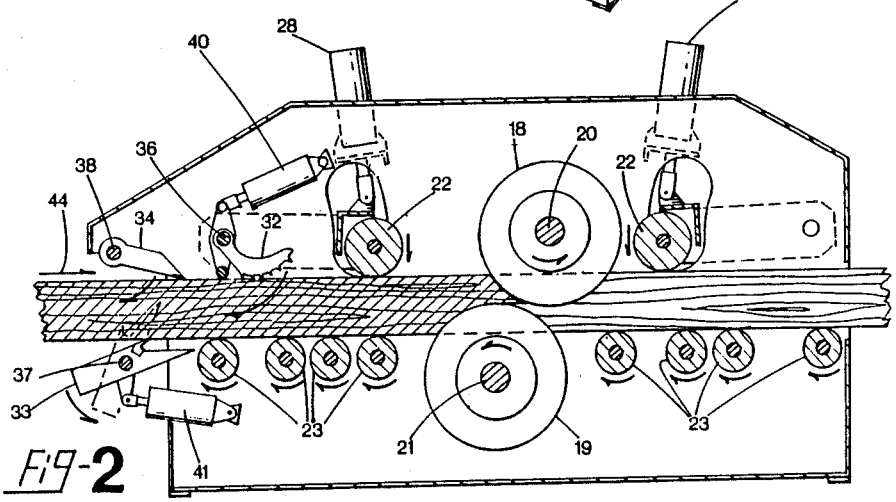
FIG. 2 is a cross-sectional view taken along lines 2—2 of FIG. 1.

FIG. 2 shows the machine as comprising a plurality of upper and lower circular saws 18, 19, mounted parallel on their respective rotatable arbour 20, 21 which are supported to the frame 12 in the usual manner. As with conventional machines of this type, a plurality of upper pressure feed rolls 22 and of lower motorized feed rolls 23 are used for moving the lumber to the battery of saws 18, 19. The arbours of rolls 23 together with arbours 20 and 21 are driven by means of a motor 26 (see FIG. 1) appropriately equipped with means (not shown) to transmit torque from the motor to these arbours. A series of hydraulic cylinders 28 are provided for operating the pressure rolls 22. It is believed that a detailed description of the sawmill machine is not necessary as these machines are conventional and well known.

Also, well known is the provision of a series of fingers mounted at the infeed side of the machine. In the machine illustrated, three sets of fingers 32, 33 and 34 are shown mounted on their respective shafts 36, 37 and 38, all parallel to one another. The series of fingers 33 and 34 mainly define a protective curtain or screen at the infeed side of the machine.

As can be seen in FIG. 2 the fingers in contact with the lumber pivot or move as the lumber is inserted in the machine; the others of the series which are not contact by the lumber remain in the screen-forming closed position. A series of hydraulic cylinders 40, 41 assist in the opening of fingers 32, 33 and 34 respectively. These fingers have tips or pointed extremities adapted to slide along the lumber as it is being processed in the machine but also to engage the lumber, should a rearward movement of the lumber occur in the direction opposite to the feeding movement, as indicated by arrow 44.

Figure 3:
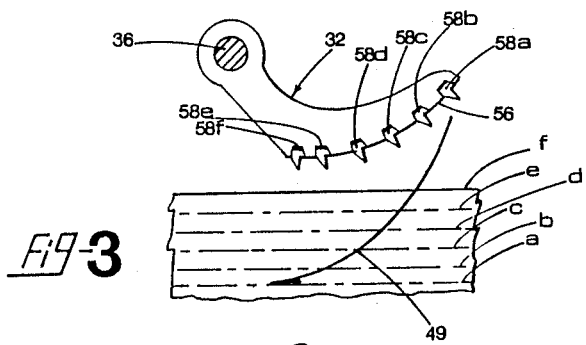
FIG. 3 is an enlarged elevational view of a finger used in the present invention for various thicknesses of lumber.
Figure 4:
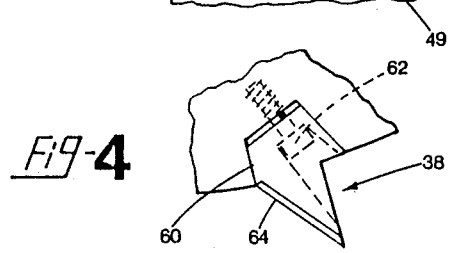
FIG. 4 is an enlarged view of a pointed element of a finger made in accordance with the present invention.

Referring more particularly to FIGS. 3, 4 and 5, the finger 32 of the first series is adapted to move in a circular direction as shown by arrow 49. This finger defines a curved lower edge 56. A series of pointed elements 58 are peripherally mounted along this edge. Each element 58 consists of a support 60 (see FIG. 4) which is secured by a bolt 62 to the finger edge 56, and of a blade 64, preferably made of carbide material, which is fixedly attached to the support 60. As shown in FIG. 3, each blade of each element 58 defines a specific angle with respect to the pivot axis 36 to thereby provide various engaging angles to the lumber being processed through the machine and thereby adapt to various thicknesses a, b, c, d, e, f of lumber or various configurations of the upper surface of the lumber being processed through the machine.

FIG. 6 shows the configuration of finger 33 of the second series of fingers mounted on shaft 37. This finger has two tips: one small 62, one long 64. The small tip 62 has a construction similar to that of tip 58: it consists of a support 66 bolted at 68 to the finger and of a blade 70, preferably of carbide material, fixedly secured to the support.

FIG. 7 shows the configuration of finger 34 of the third series of fingers mounted on shaft 38. This finger has a long tapered tip 72, to the extremity of which is fixedly secured a blade 74, preferably of carbide material.

Although the invention has been described above in relation to one specific form, it will be evident to the person skilled in the art that it may be refined and modified in various ways. It is therefore wished to have it understood that the present invention should not be limited in interpretation except by the terms of the following claims.

The embodiments of the invention in which an exclusive property or privilege is claimed are defined as follows:

1. In a sawmill machine for ripsawing and square edging lumber passing from a feeding end to an exit end, including: a frame and feed rolling means feeding, frontwardly of said frame, lumber to a series of rotating saws, an anti-kickback device for preventing said lumber from being forced rearwardly towards the feeding end of said machine, comprising:
   a first shaft mounted transversely of said frame upstream of said rotating saws;
   a first series of fingers pivotably mounted on said shaft and adapted to be pivoted by said lumber as it is processed to said rotated saws; each finger of said first series defining a curved edge and a series of lumber engaging tips spaced along said curved edge;
   a second shaft mounted transversely of said frame upstream of said first shaft;
   a second series of fingers pivotably mounted on said second shaft and adapted to be pivoted by said lumber prior to reaching said first shaft as it is processed to said feed rolling means; each finger of said second series having lumber engaging tip means;
   a third shaft mounted transversely of said frame upstream of said second shaft;
   a third series of fingers pivotably mounted on said third shaft and adapted to be pivoted by said lumber as it is fed at said feeding end; and
   the second and third series of fingers being located on opposite sides of the lumber and capable of engaging each other in the absence of said lumber.

2. In a sawmill machine as defined in claim 1, wherein each said tip of said first series of fingers consists of a support removably attached to said edge and a blade fixedly mounted to said support.

3. In a sawmill machine as defined in claim 2, wherein said blade is made of carbide material.

4. In a sawmill machine as defined in claim 1, wherein each said tip of said first series of fingers define a different angle relative to the pivot axis of said finger; each said angle corresponding to a different thickness of lumber passing through the machine.

5. In a sawmill machine as defined in claim 1, wherein said first and third shafts are mounted parallel to one another above the lumber and to the second shaft; said second shaft being located below said lumber and below said third shaft.

6. In a sawmill machine as defined in claim 1, wherein said lumber engaging tip means of said second series of fingers include a pair of tips, one being small, the other being long.

7. In a sawmill machine as defined in claim 6, wherein said small tip consists of a support removably mounted to said finger and a blade fixedly mounted to said support.

8. In a sawmill machine as defined in claim 7, wherein said blade is made of carbide material.

9. For use in sawmill machines for ripsawing or square edging lumber, including at least a frame and means for feeding, frontwardly of said frame, lumber to a series of circular saws, an anti-kickback device for preventing said lumber from being thrown in a direction opposite to the feeding direction of the lumber in the machine, comprising: two or more shaft means mounted transversely of said frame upstream of said saws; a series of adjacently disposed fingers defining a protective curtain mounted on said shaft means; said fingers being pivotably mounted on said shaft and adapted to be moved as lumber is processed to said circular saws; each finger of a series mounted on one of said shaft means having a curved edge including a plurality of pointed lumber engaging elements peripherally spaced along said curved edge to engage lumber at various optimum angles depending on the thickness of lumber passing through the machine, the series of fingers on at least two of the shafts being located on opposite sides of the lumber and capable of engaging each other in the absence of said lumber.

* * * * *